US012599975B2

(12) United States Patent
Kawabata et al.

(10) Patent No.: US 12,599,975 B2
(45) Date of Patent: Apr. 14, 2026

(54) ROTARY CUTTING TOOL

(71) Applicant: A.L.M.T. Corp., Tokyo (JP)

(72) Inventors: Takeshi Kawabata, Tokyo (JP);
Shuichi Kawano, Osaka (JP)

(73) Assignee: A.L.M.T. Corp., Tokyo (JP)

( * ) Notice: Subject to any disclaimer, the term of this
patent is extended or adjusted under 35
U.S.C. 154(b) by 373 days.

(21) Appl. No.: 17/913,383

(22) PCT Filed: Feb. 3, 2021

(86) PCT No.: PCT/JP2021/003855
§ 371 (c)(1),
(2) Date: Sep. 21, 2022

(87) PCT Pub. No.: WO2021/192629
PCT Pub. Date: Sep. 30, 2021

(65) Prior Publication Data
US 2023/0147380 A1 May 11, 2023

(30) Foreign Application Priority Data
Mar. 23, 2020 (JP) ................................. 2020-050718

(51) Int. Cl.
*B23D 77/02* (2006.01)
*B23B 51/00* (2006.01)
*B23B 51/06* (2006.01)

(52) U.S. Cl.
CPC .............. *B23B 51/00* (2013.01); *B23D 77/02*
(2013.01); *B23B 2251/14* (2013.01); *B23B*
*2260/072* (2013.01)

(58) Field of Classification Search
CPC ..... B23B 51/00; B23B 51/063; B23B 51/066;
B23B 2251/085; B23B 2251/424; B23B
2251/48; B23B 2251/248; B23B 2251/56
See application file for complete search history.

(56) References Cited

U.S. PATENT DOCUMENTS 85,107 A * 12/1868 Le Count .............. B23B 51/108
408/229
2,322,894 A * 6/1943 Stevens ................... B23B 51/02
408/230

(Continued)

FOREIGN PATENT DOCUMENTS

CA 3102405 A1 * 12/2019 .......... B23B 1/0486
CN 1162942 A 10/1997

(Continued)

OTHER PUBLICATIONS

Office Action issued in JP Patent Application 2021-543192, dated
Nov. 2, 2021.

(Continued)

*Primary Examiner* — Nicole N Ramos
(74) *Attorney, Agent, or Firm* — McCarter & English,
LLP; Michael A. Sartori

(57) ABSTRACT
A rotary cutting tool includes a tool body and a cutting edge
tip provided at the tool body. At least one first groove is
provided in a rake face of the cutting edge tip, the first
groove has a portion inclined with respect to a rotation axis,
and a front end of the first groove is provided at a front
cutting edge. A rear end of the first groove is provided on an
inner side with respect to an outer peripheral cutting edge,
and an irregularity of the outer peripheral cutting edge is 30
μm or less.

6 Claims, 20 Drawing Sheets

(56) References Cited

U.S. PATENT DOCUMENTS

| | | | | |
|---|---|---|---|---|
| 3,395,434 | A | 8/1968 | Wirfelt | |
| 4,116,580 | A * | 9/1978 | Hall | B23B 51/02 |
| | | | | 407/54 |
| 4,710,069 | A | 12/1987 | Loqvist | |
| 4,802,799 | A * | 2/1989 | Rachev | B23B 51/02 |
| | | | | 407/62 |
| 5,160,232 | A * | 11/1992 | Maier | B23B 51/02 |
| | | | | 407/54 |
| 5,791,833 | A * | 8/1998 | Niebauer | B23B 27/141 |
| | | | | 407/116 |
| 5,967,710 | A | 10/1999 | Krenzer | |
| 5,984,005 | A * | 11/1999 | Hart | E21B 29/002 |
| | | | | 166/55.6 |
| 6,135,681 | A | 10/2000 | Nuzzi et al. | |
| 6,213,692 | B1 * | 4/2001 | Guehring | B23B 51/02 |
| | | | | 408/230 |
| 6,524,036 | B1 * | 2/2003 | Kolker | B23B 27/143 |
| | | | | 408/230 |
| 9,050,666 | B2 * | 6/2015 | Kuroda | B23C 5/10 |
| 11,141,799 | B2 * | 10/2021 | Nakata | B23B 51/02 |
| 11,642,730 | B2 * | 5/2023 | Waki | B23C 5/16 |
| | | | | 407/53 |
| 11,969,804 | B2 * | 4/2024 | Schur | B23B 51/0486 |
| 2007/0098506 | A1 * | 5/2007 | Flynn | B23C 5/10 |
| | | | | 407/53 |
| 2009/0220311 | A1 | 9/2009 | Shamoto et al. | |
| 2010/0061813 | A1 | 3/2010 | Horiike et al. | |
| 2011/0008113 | A1 | 1/2011 | Abe | |
| 2012/0121352 | A1 | 5/2012 | Ning et al. | |
| 2015/0117972 | A1 * | 4/2015 | Osaki | B23C 5/1009 |
| | | | | 407/115 |
| 2015/0231703 | A1 * | 8/2015 | Bjormander | C23C 16/0263 |
| | | | | 407/115 |
| 2016/0175944 | A1 * | 6/2016 | Lyu | B23C 5/10 |
| | | | | 407/54 |
| 2017/0361384 | A1 * | 12/2017 | Boulakhov | B23C 5/10 |
| 2018/0318939 | A1 | 11/2018 | Harada et al. | |
| 2019/0232432 | A1 * | 8/2019 | Kreisel | B23B 27/005 |
| 2020/0086401 | A1 | 3/2020 | Hagward et al. | |

FOREIGN PATENT DOCUMENTS

| | | | | |
|---|---|---|---|---|
| CN | 101977715 A | 2/2011 | | |
| CN | 102189287 A | 9/2011 | | |
| CN | 102228998 A | 11/2011 | | |
| CN | 106424883 B * | 3/2019 | | B23C 5/1009 |
| DE | 102011000882 A1 | 8/2012 | | |
| EP | 2441543 A1 | 4/2012 | | |
| EP | 3175943 A1 * | 6/2017 | | B23B 51/02 |
| GB | 452750 A * | 12/1935 | | |
| JP | S52-134182 A | 11/1977 | | |
| JP | S58-044135 U | 9/1981 | | |
| JP | S59-193616 U | 12/1984 | | |
| JP | S60-165108 U | 11/1985 | | |
| JP | 2001-322029 A | 11/2001 | | |
| JP | 2002-542951 A | 12/2002 | | |
| JP | 2003-231015 A | 8/2003 | | |
| JP | 2005-313287 A | 11/2005 | | |
| JP | 2008-068345 A | 3/2008 | | |
| JP | 2009-107051 A | 5/2009 | | |
| JP | 2009-208161 A | 9/2009 | | |
| JP | 2012-045635 A | 3/2012 | | |
| JP | 2012-106334 A | 6/2012 | | |
| JP | 2013-146819 A | 8/2013 | | |
| JP | 2015-217502 A | 12/2015 | | |
| JP | 2017-094467 A | 6/2017 | | |
| JP | 2018-008363 A | 1/2018 | | |
| JP | 2019-136789 A | 8/2019 | | |
| WO | WO-2007099777 A1 * | 9/2007 | | B23C 5/06 |

OTHER PUBLICATIONS

Office Action issued in JP Patent Application No. 2021-543192, dated Feb. 8, 2022.
Communication issued in Chinese Application No. 2021800242901 dated Jan. 6, 2025.

* cited by examiner

ROTARY CUTTING TOOL

TECHNICAL FIELD

The present invention relates to a rotary cutting tool. The present application claims a priority based on Japanese Patent Application No. 2020-050718 filed on Mar. 23, 2020, the entire content of which is incorporated herein by reference.

BACKGROUND ART

Conventionally, rotary cutting tools are disclosed, for example, in Japanese Patent Laying-Open No. 2012-106334 (PTL 1), Japanese Utility Model Laying-Open No. 58-44135 (PTL 2) and Japanese Utility Model Laying-Open No. 60-165108 (PTL 3).

CITATION LIST

Patent Literature

PTL 1: Japanese Patent Laying-Open No. 2012-106334

PTL 2: Japanese Utility Model Laying-Open No. 58-44135

PTL 3: Japanese Utility Model Laying-Open No. 60-165108

SUMMARY OF INVENTION

In a rotary cutting tool including a tool body and a cutting edge tip provided at the tool body, at least one first groove is provided in a rake face of the cutting edge tip, the first groove has a portion inclined with respect to a rotation axis, a front end of the first groove is provided at a front cutting edge or a corner chamfering cutting edge, a rear end of the first groove is provided on an inner side with respect to an outer peripheral cutting edge, and an irregularity of the outer peripheral cutting edge is 30 μm or less.

BRIEF DESCRIPTION OF DRAWINGS

FIG. 3 is a right side view of the rotary cutting tool according to the first embodiment.

FIG. 16 is a diagram showing an exemplary cross sectional shape of a groove.

DESCRIPTION OF EMBODIMENTS

Problem to be Solved by the Present Disclosure

With the conventional rotary cutting tools, it is difficult to cut off chip, disadvantageously.

Advantageous Effect of the Present Disclosure

A rotary cutting tool capable of cutting off chip can be provided.

DESCRIPTION OF EMBODIMENTS

First, embodiments of the present disclosure are listed and described.

First Embodiment

Figure 1:
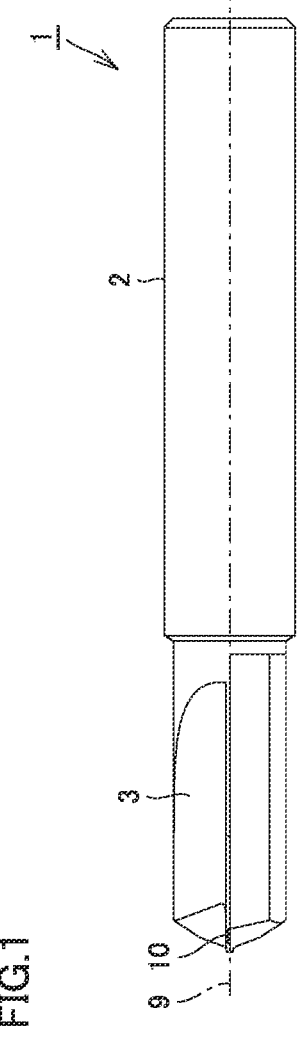
FIG. 1 is a front view of a rotary cutting tool according to a first embodiment.
Figure 2:
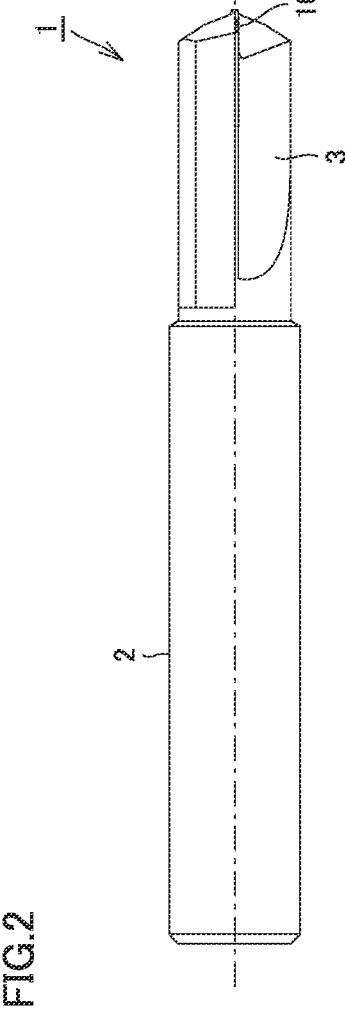
FIG. 2 is a rear view of the rotary cutting tool according to the first embodiment.
Figure 3:
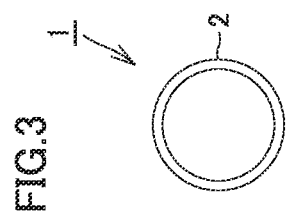
Figure 4:
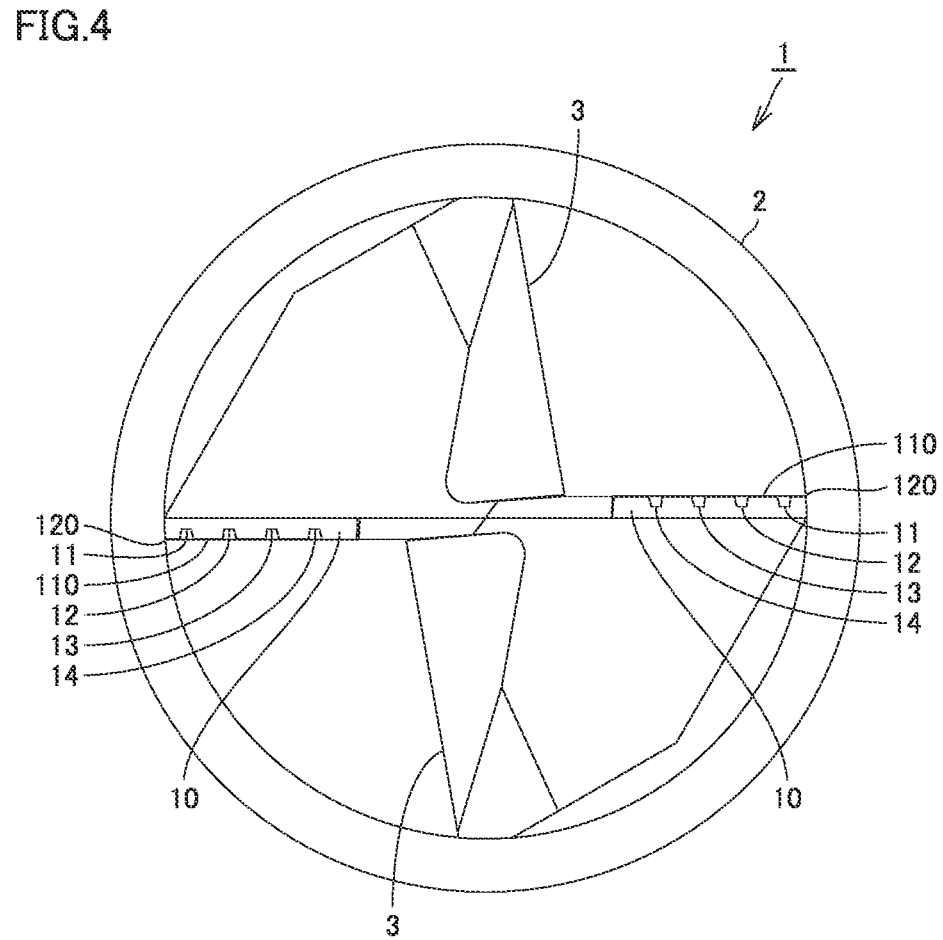
FIG. 4 is a left side view of the rotary cutting tool according to the first embodiment.
Figure 5:
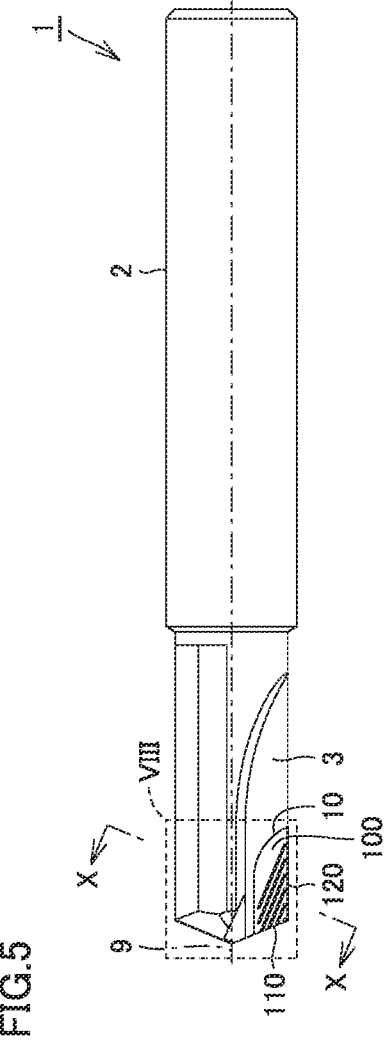
FIG. 5 is a plan view of the rotary cutting tool according to the first embodiment.
Figure 6:
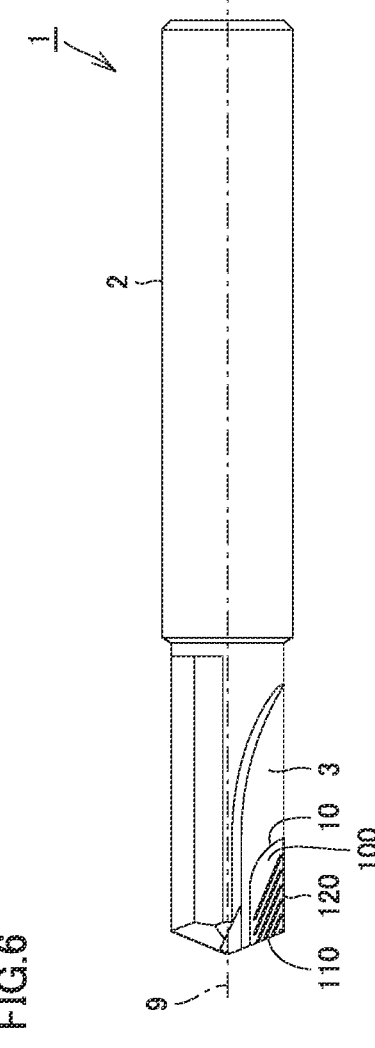
FIG. 6 is a bottom view of the rotary cutting tool according to the first embodiment.
Figure 7:
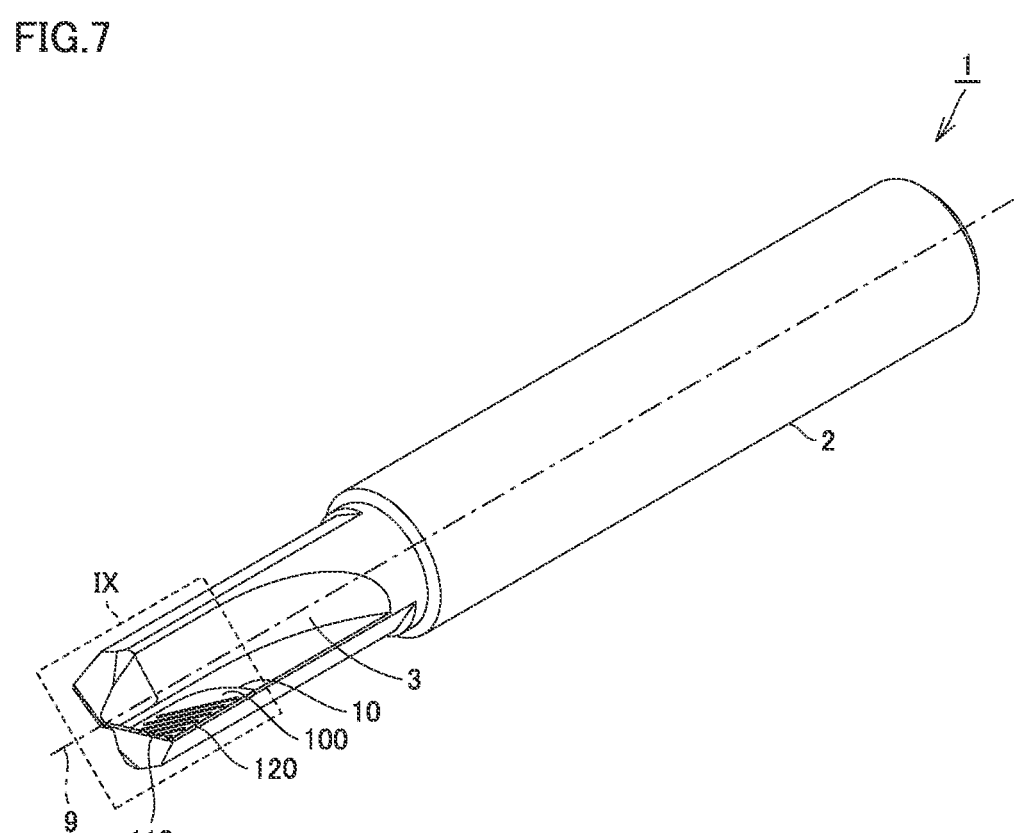
FIG. 7 is a perspective view of the rotary cutting tool according to the first embodiment.
Figure 8:
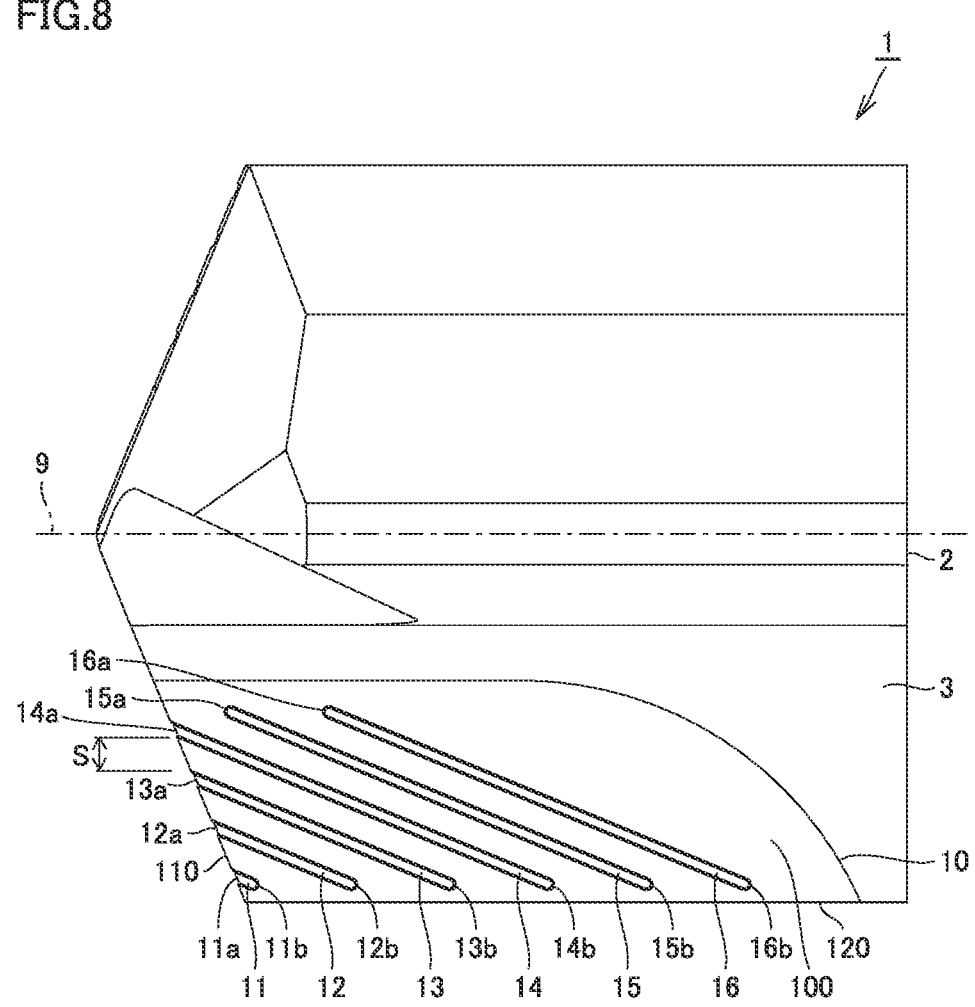
FIG. 8 is an enlarged view showing a portion surrounded by VIII in FIG. 5.

FIG. 1 is a front view of a rotary cutting tool according to a first embodiment. FIG. 2 is a rear view of the rotary cutting tool according to the first embodiment. FIG. 3 is a right side view of the rotary cutting tool according to the first embodiment. FIG. 4 is a left side view of the rotary cutting tool according to the first embodiment. FIG. 5 is a plan view of the rotary cutting tool according to the first embodiment. FIG. 6 is a bottom view of the rotary cutting tool according to the first embodiment. FIG. 7 is a perspective view of the rotary cutting tool according to the first embodiment. FIG. 8 is an enlarged view showing a portion surrounded by VIII in FIG. 5.

As shown in FIGS. 1 to 8, a rotary cutting tool 1 according to the first embodiment includes a tool body 2 and a cutting edge tip 10 provided at tool body 2. At least one first groove 11, 12, 13, 14 is provided in a rake face 100 of cutting edge tip 10, first groove 11, 12, 13, 14 has a portion inclined with respect to a rotation axis 9, and a front end 11*a*, 12*a*, 13*a*, 14*a* of first groove 11, 12, 13, 14 is provided at a front cutting edge 110. A rear end 11*b*, 12*b*, 13*b*, 14*b* of first groove 11, 12, 13, 14 is provided on an inner side with respect to an outer peripheral cutting edge 120, and an irregularity of outer peripheral cutting edge 120 is 30 μm or less.

The irregularity is measured as follows.

(1) The tool is set on a stage such that a portion of outer peripheral cutting edge 120 can be seen in a direction perpendicular to rake face 100 with the use of a tool microscope at a magnification of 30×. The stage is rotated while maintaining a state in which the optical axis of the tool microscope is perpendicular to rake face 100, and a cutting edge ridgeline is aligned with a reference line of a calibration marking provided on the lens of the tool microscope so as to fix the rotation axis of the stage.

(2) The stage is moved to a position at which the reference line of the calibration marking is tangential to a portion of the irregularity on the innermost peripheral side.

(3) A distance in which the stage has been moved in (2) is read by a digital measuring device, and this distance is defined as the magnitude of the irregularity. It should be noted that the irregularity herein refers to, for example, an irregularity resulting from chipping (breakage at the ridgeline) caused at a ridgeline portion of the outer peripheral cutting edge, an irregularity resulting from detachment in the vicinity of the ridgeline on the rake face side, an irregularity resulting from a groove being formed to extend to the outer peripheral cutting edge portion, or the like.

By providing front ends 11a, 12a, 13a, 14a of grooves 11, 12, 13, 14 at a working portion of front cutting edge 110, chip can be cut off in the width direction, thereby attaining a small chip width.

Even when chip caused by front cutting edge 110 is elongated rearward, the chip is cut off in the length direction at portions at which first grooves 11, 12, 13, 14 obliquely extending rearward with respect to front cutting edge 110 are present. With such a function of cutting off, the chip can be short. When a distance from front cutting edge 110 to each of first grooves 11, 12, 13, 14 becomes long, this function is less likely to be exhibited.

In the configuration in which first grooves 11, 12, 13, 14 are oriented outward as shown in FIG. 8, front ends 11a, 12a, 13a, 14a of first grooves 11, 12, 13, 14 should be provided at the working portion of front cutting edge 110 on the inner peripheral side (the side close to rotation axis 9) as much as possible. It should be noted that preferable positions of front ends 11a, 12a, 13a, 14a of first grooves 11, 12, 13, 14 are changed depending on a processing condition or a type of workpiece. Thus, the chip caused on the inner peripheral side with respect to front ends 11a, 12a, 13a, 14a of first grooves 11, 12, 13, 14 becomes small in width, and even when there is no oblique groove at the rear of front cutting edge 110, the chip small in width is likely to be curled and fractured, with the result that the chip is also likely to be small in the length direction. Further, since the tool according to the present disclosure is a rotary cutting tool, the chip length on the side close to the outer periphery of front cutting edge 110 is longer than the chip length on the side close to the inner periphery of front cutting edge 110, with the result that the resulting chip has a shape of fan. Further, the shape of fan of the chip has a small radius, so that the chip is likely to be curled and fractured. On the other hand, chip caused on the outer peripheral side with respect to front ends 11a, 12a, 13a, 14a is finely cut off by the function of cutting off by first grooves 11, 12, 13, 14.

Figure 9:
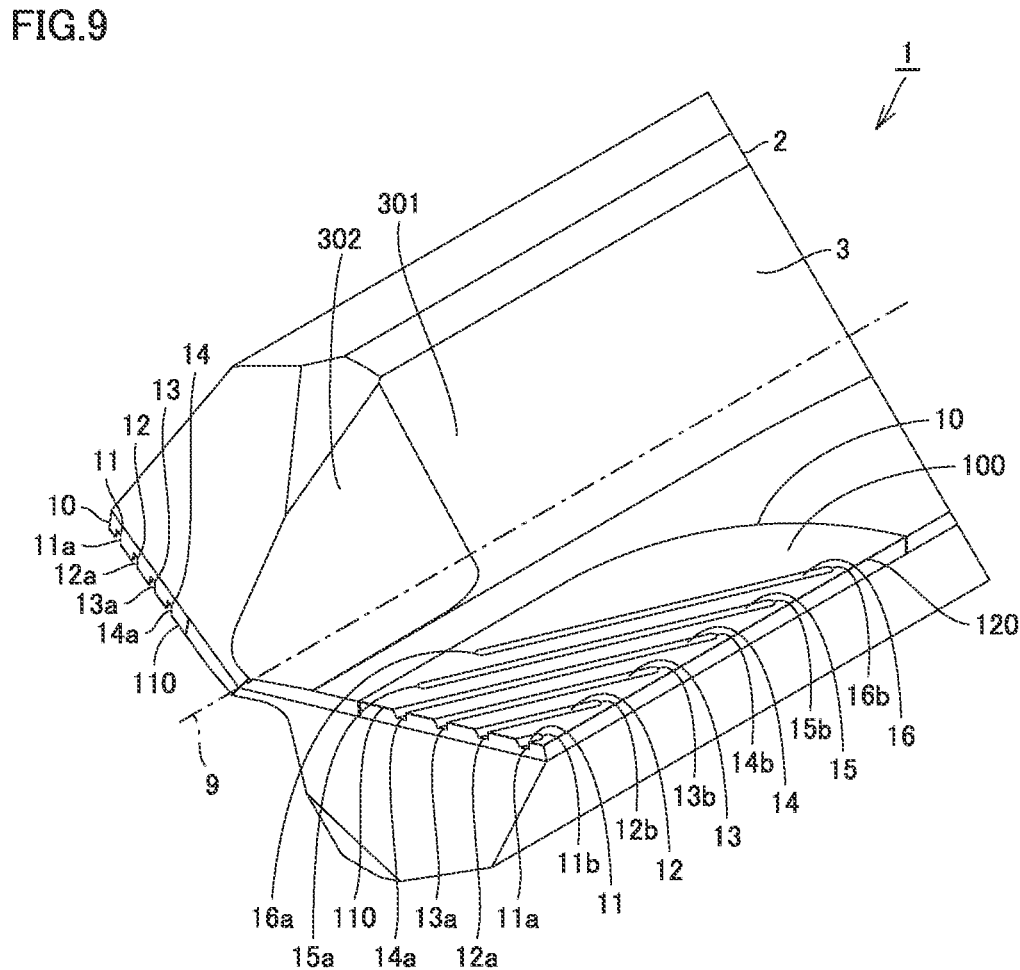
FIG. 9 is an enlarged view showing a portion surrounded by IX in FIG. 7.

FIG. 9 is an enlarged view showing a portion surrounded by IX in FIG. 7. As shown in FIGS. 8 and 9, rear ends 11b, 12b, 13b, 14b of first grooves 11, 12, 13, 14 do not reach outer peripheral cutting edge 120. Further, rear ends 15b, 16b of other grooves 15, 16 do not reach outer peripheral cutting edge 120. Therefore, the irregularity of outer peripheral cutting edge 120 can be 30 μm or less. When the irregularity of outer peripheral cutting edge 120 is large, the shape of the irregularity is transferred to the inner surface of the hole of the workpiece, thus resulting in decreased processing precision. Front ends 15a, 16a of grooves 15, 16 do not reach front cutting edge 110. Each of the shapes of end surfaces of rear ends 11b, 12b, 13b, 14b of first grooves 11, 12, 13, 14 is a quadrangular shape, and a direction of the end surface (direction orthogonal to the normal line of the end surface) may be parallel to front cutting edge 110.

Tool body 2 and cutting edge tip 10 constitute rake face 100. A flute 3 is provided in tool body 2. Flute 3 is defined by wall surfaces 301, 302. Each of wall surfaces 301, 302 is configured to extend along the length direction of tool body 2.

Figure 10:
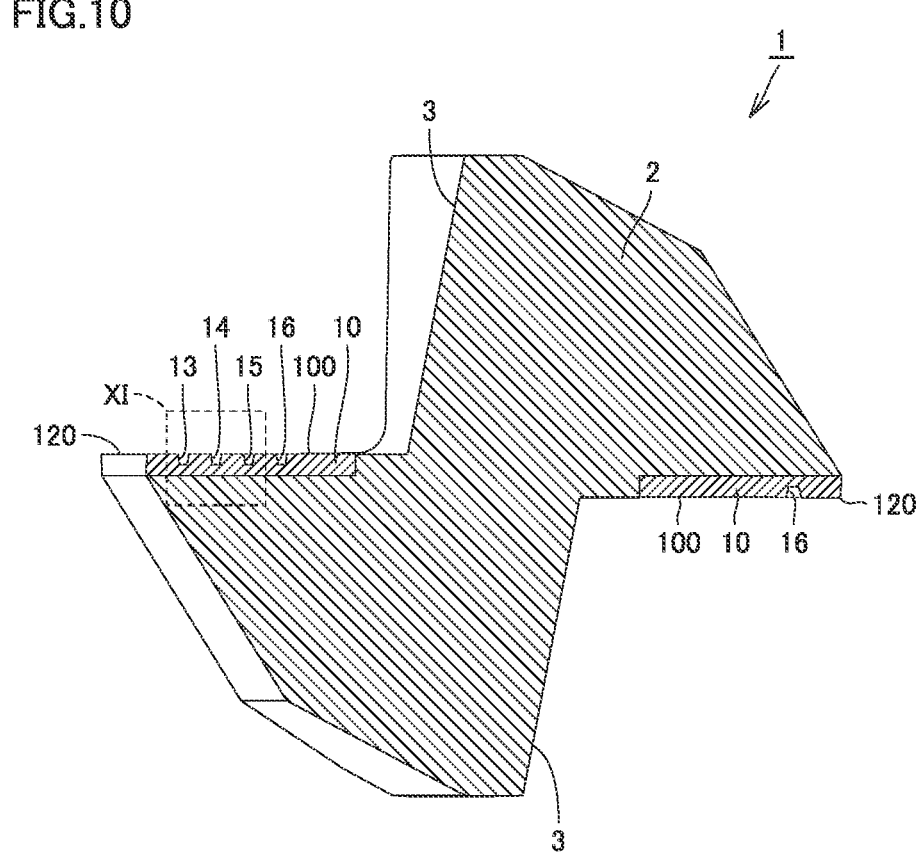
FIG. 10 is a cross sectional view taken along a line X-X in FIG. 5.
Figure 11:
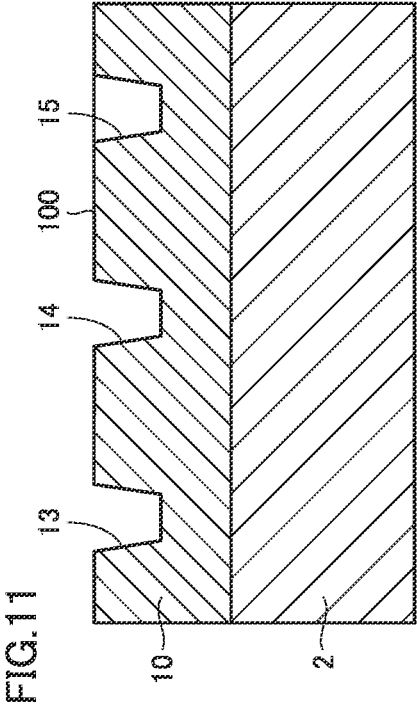
FIG. 11 is an enlarged cross sectional view showing a portion surrounded by XI in FIG. 10.

FIG. 10 is a cross sectional view taken along a line X-X in FIG. 5. FIG. 11 is an enlarged cross sectional view showing a portion surrounded by XI in FIG. 10. As shown in FIGS. 10 and 11, cutting edge tip 10 is embedded in tool body 2. First grooves 13, 14 and grooves 15, 16 are formed in rake face 100, which is a surface of cutting edge tip 10. Each of first grooves 13, 14 and grooves 15, 16 has a quadrangular shape.

In rotary cutting tool 1 configured as described above, each of first grooves 11, 12, 13, 14 has a portion inclined with respect to rotation axis 9, and each of front ends 11a, 12a, 13a, 14a of first grooves 11, 12, 13, 14 is provided at front cutting edge 110, with the result that chip is likely to be cut off. Further, since each of rear ends 11b, 12b, 13b, 14b of first grooves 11, 12, 13, 14 is provided on the inner side with respect to outer peripheral cutting edge 120 and the irregularity of outer peripheral cutting edge 120 is 30 μm or less, a hole of the workpiece can be made smooth.

Second Embodiment

Figure 12:
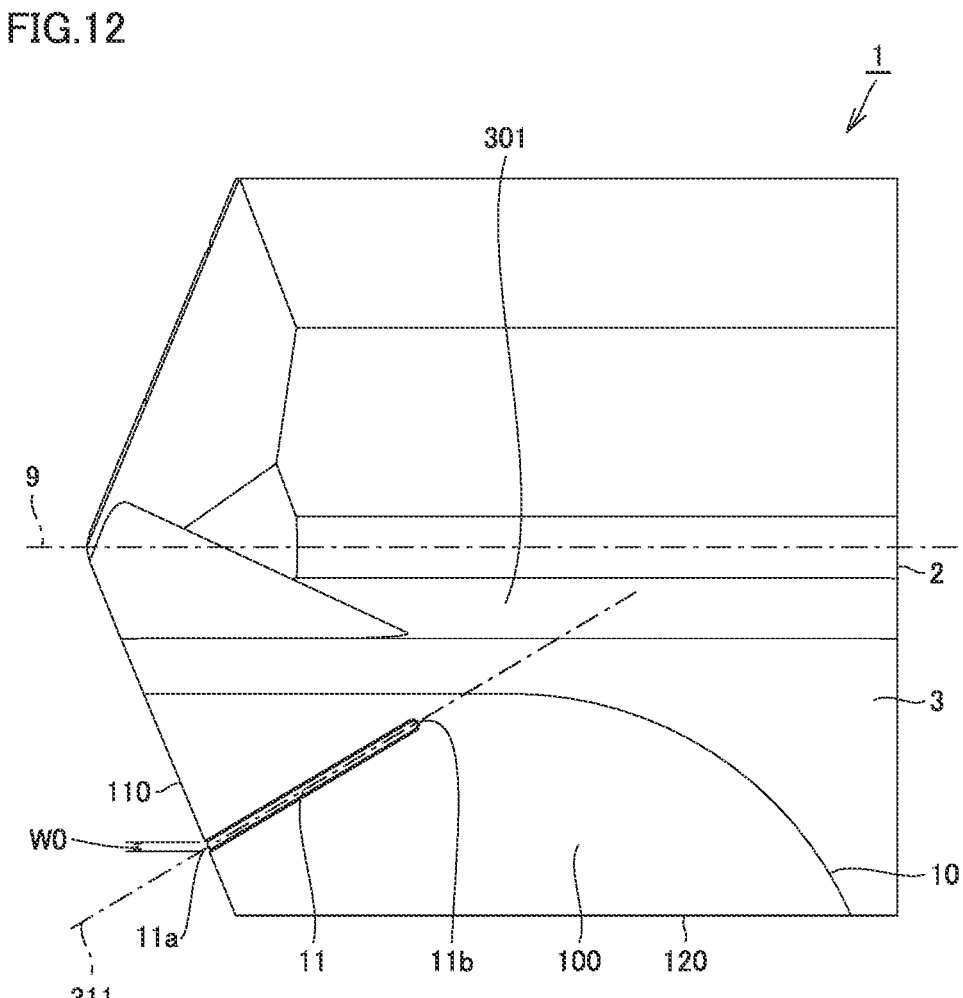
FIG. 12 is a front view of a rotary cutting tool according to a second embodiment.

FIG. 12 is a front view of a rotary cutting tool according to a second embodiment. As shown in FIG. 12, in a rotary cutting tool 1 according to the second embodiment, a first groove 11 is provided to be oriented inward. The expression "oriented inward" means that first groove 11 is inclined to be closer to rotation axis 9 in a direction away from front cutting edge 110. On the contrary, the expression "oriented outward" means that first groove 11 is inclined to be further away from rotation axis 9 in the direction away from front cutting edge 110.

Front end 11a of first groove 11 is provided at front cutting edge 110. Rear end 11b of first groove 11 does not reach outer peripheral cutting edge 120. The irregularity of outer peripheral cutting edge 120 is 30 μm or less.

Thus, in the configuration in which first groove 11 extends inward, front end 11a of first groove 11 is preferably provided at front cutting edge 110 on the outer peripheral side as much as possible. Accordingly, chip caused on the outer peripheral side with respect to front end 11a of first groove 11 becomes small in width. Even when there is no oblique groove at the rear of front cutting edge 110, the chip small in width is likely to be curled and fractured, with the result that the chip is also likely to be small in the length direction. Further, this chip may be curled to the inner peripheral side, may be tangled with chip caused on the inner peripheral side with respect to front end 11a, and may be accordingly cut off, with the result that the chip is likely to be small in the length direction. In the case where the chip is curled to the outer peripheral side, the length of the chip is likely to become short due to contact with the processing surface; however, since the chip is small in width, contact force to the processing surface is small and the processing surface is not damaged. On the other hand, the chip caused on the inner peripheral side with respect to front end 11a is finely cut off based on the reason described in the first embodiment why the width of the chip caused on the inner peripheral side becomes small.

Further, the chip caused at a portion of front cutting edge 110 on the inner peripheral side with respect to front end 11a of first groove 11 is gradually curled and flow on rake face 100, and are cut off when the chip comes into contact with groove 11. Otherwise, chip that is insufficiently curled and that is not cut off flows along groove 11 when the chip comes into contact with groove 11, and heads toward rear end 11b of grooves 11. On this occasion, when rake face 100 and wall surface 301 intersecting with the extending direction of groove 11 indicated by a line 311 are provided in the vicinity of rear end 11b of groove 11, the chip comes into contact with wall surface 301 to attain a small radius of curling, thereby obtaining such an effect that the chip is likely to be cut off.

It should be noted that since the radius of curling is normally at least about 5 mm, and often about 10 mm or 20 mm, the above effect can be sufficiently obtained when a space between rear end 11b of groove 11 and wall surface 301 is 5 mm or less.

Third Embodiment

Figure 13:
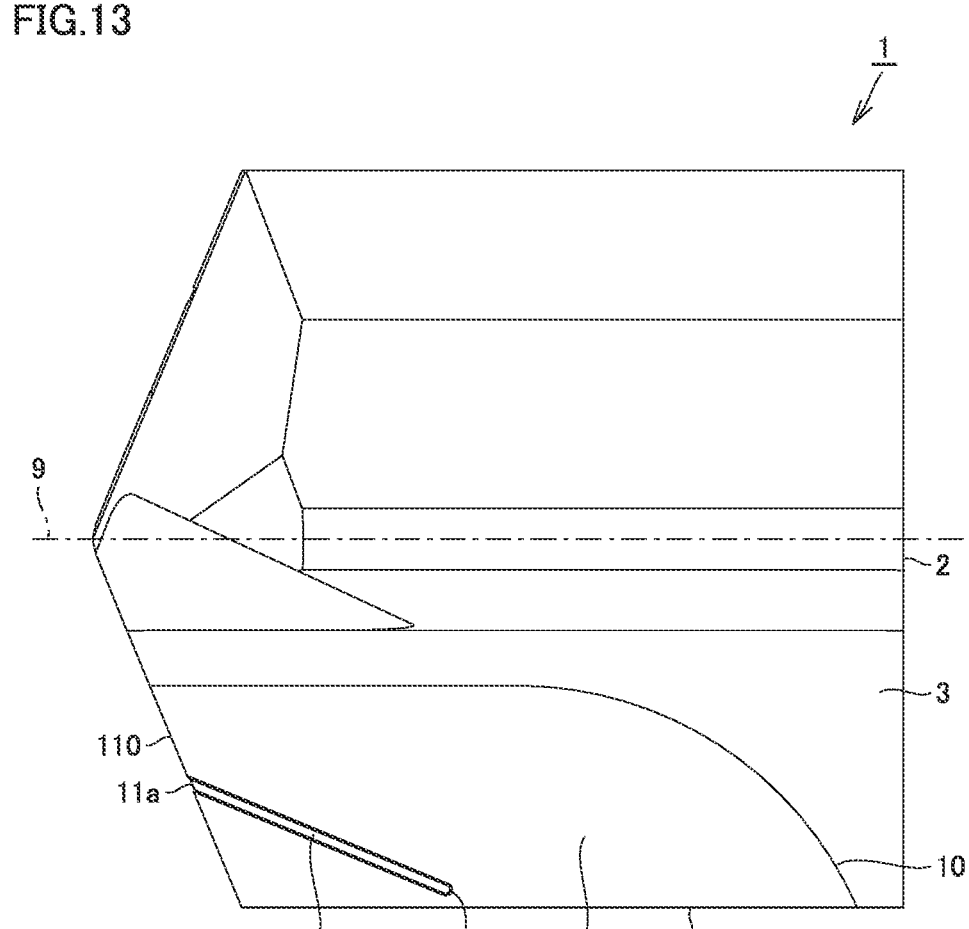
FIG. 13 is a front view of a rotary cutting tool according to a third embodiment.

FIG. 13 is a front view of a rotary cutting tool according to a third embodiment. A rotary cutting tool 1 according to the first embodiment is different from rotary cutting tool 1 according to the first embodiment in that one first groove 11 is only provided. Front end 11a of first groove 11 is provided at front cutting edge 110. Rear end 11b of first groove 11 does not reach outer peripheral cutting edge 120. The irregularity of outer peripheral cutting edge 120 is 30 μm or less. Since one first groove 11 is only provided, rotary cutting tool 1 according to the third embodiment can be readily manufactured although the effect by the groove is smaller than that in rotary cutting tool 1 according to the first embodiment.

Fourth Embodiment

Figure 14:
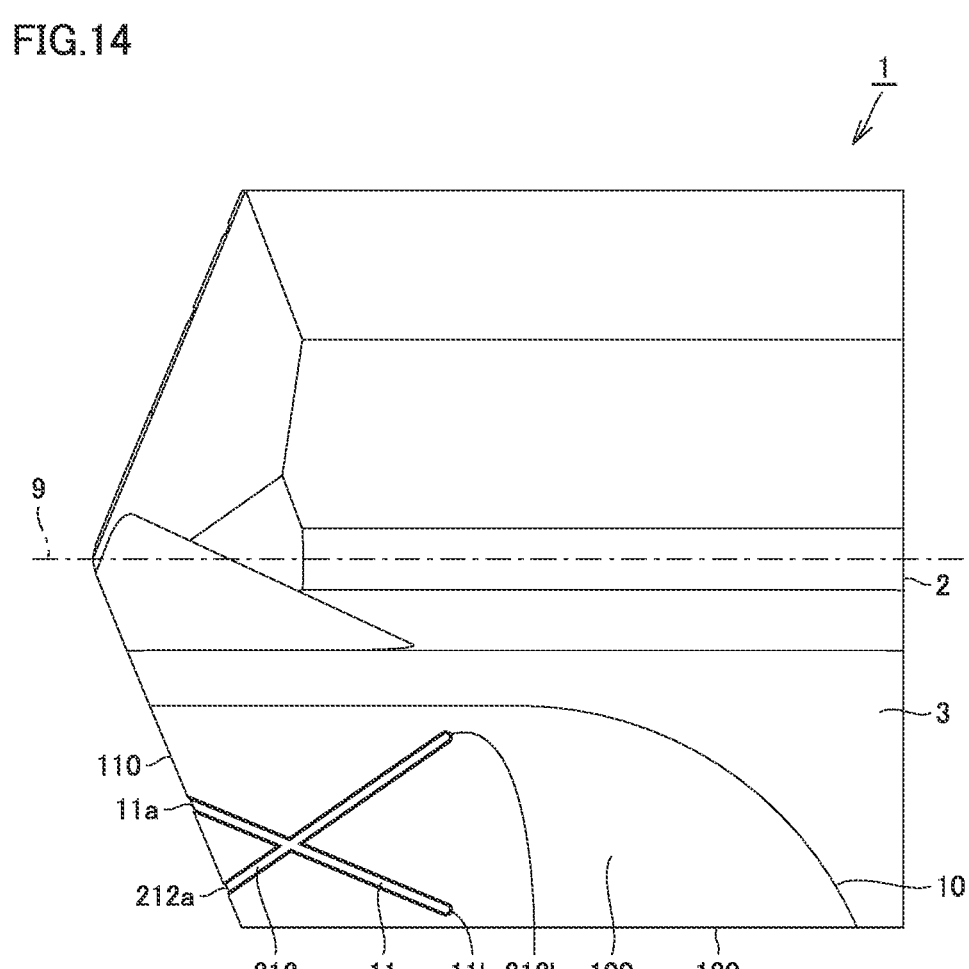
FIG. 14 is a front view of a rotary cutting tool according to a fourth embodiment.

FIG. 14 is a front view of a rotary cutting tool according to a fourth embodiment. As shown in FIG. 14, in a rotary cutting tool 1 according to the fourth embodiment, first groove 11 extends outward and a second groove 212 extends inward. That is, it is different from rotary cutting tools 1 of the first and second embodiments in that the extending directions of first groove 11 and second groove 212 are different from each other. Each of front ends 11a, 212a reaches front cutting edge 110. On the other hand, each of rear ends 11b, 212b does not reach outer peripheral cutting edge 120.

Each of front ends 11a, 212a of first groove 11 and second groove 212 is provided at front cutting edge 110 and has such a shape that it is opened in the longitudinal direction. Each of rear ends 11b, 12b of first groove 11 and second groove 212 do not reach outer peripheral cutting edge 120 and has such a shape that it is closed in the longitudinal direction. The irregularity of outer peripheral cutting edge 120 is 30 μm or less. By providing second groove 212 oriented inward and first groove 11 oriented outward, both the effects by the groove oriented inward and the groove oriented outward can be exhibited.

Further, there is such an effect that chip is likely to be finely cut off at a portion at which first groove 11 and second groove 212 intersect with each other.

Fifth Embodiment

Figure 15:
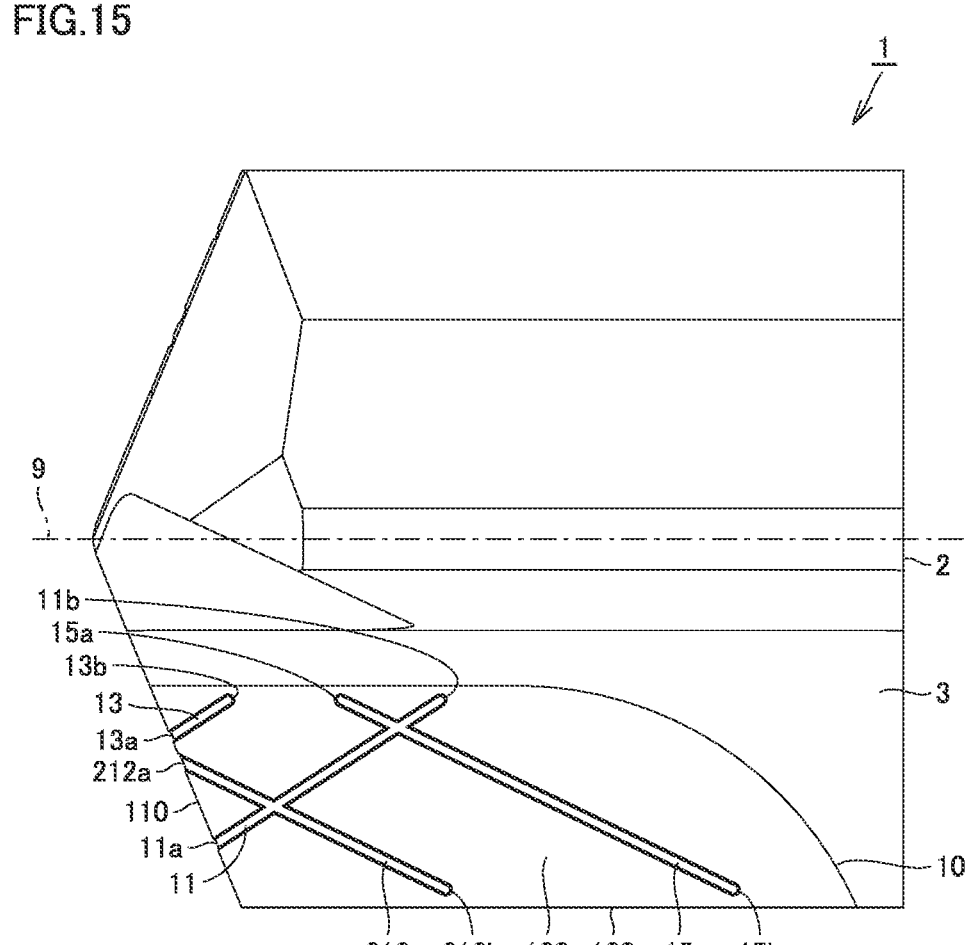
FIG. 15 is a front view of a rotary cutting tool according to a fifth embodiment.

FIG. 15 is a front view of a rotary cutting tool according to a fifth embodiment. As shown in FIG. 15, in a rotary cutting tool 1 according to the fifth embodiment, two first grooves 11, 13 are oriented inward, and one second groove 212 is oriented outward. Front end 15a of groove 15 does not reach front cutting edge 110. All the rear ends 11b, 212b, 13b, 15b do not reach outer peripheral cutting edge 120.

Front end 11a, 13a of first grooves 11, 13 and front end 212a of second groove 212 are provided at front cutting edge 110. Rear ends 11b, 13b of first grooves 11, 13 and rear end 212b of second groove 212 do not reach outer peripheral cutting edge 120. The irregularity of outer peripheral cutting edge 120 is 30 μm or less.

Figure 16:
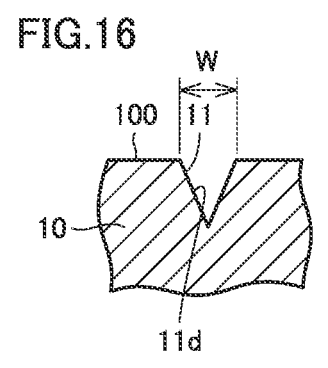
Figure 17:
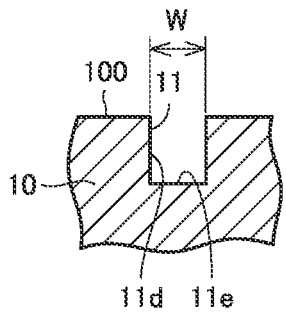
FIG. 17 is a diagram showing an exemplary cross sectional shape of the groove.
Figure 18:
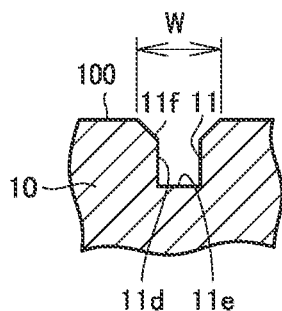
FIG. 18 is a diagram showing an exemplary cross sectional shape of the groove.
Figure 19:
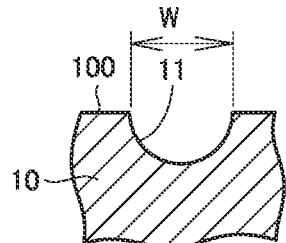
FIG. 19 is a diagram showing an exemplary cross sectional shape of the groove.

Each of FIGS. 16 to 19 is a diagram showing an exemplary cross sectional shape of each groove. As shown in FIG. 16, the cross sectional shape of first groove 11 is a V shape. A side surface 11d of groove 11 forms an angle with respect to rake face 100. As shown in FIG. 17, groove 11 may be constituted of: side surface 11d perpendicular to rake face 100; and a bottom surface 11e parallel to rake face 100. As shown in FIG. 18, a tapered surface 11f may be provided in the vicinity of the entrance of groove 11, and side surface 11d and bottom surface 11e similar to those in FIG. 17 may be provided as shown in FIG. 18. This shape is hereinafter referred to as "V shape with bottom surface". As shown in FIG. 19, groove 11 may be formed to have an arc shape. The cross sectional shape of each of these grooves 11 is employed in each of the embodiments.

That is, the cross sectional shape of first groove 11 may be any one of the V shape, the quadrangular shape, the shape obtained by combining the V shape and the quadrangular shape, and the circular shape.

Sixth Embodiment

Figure 20:
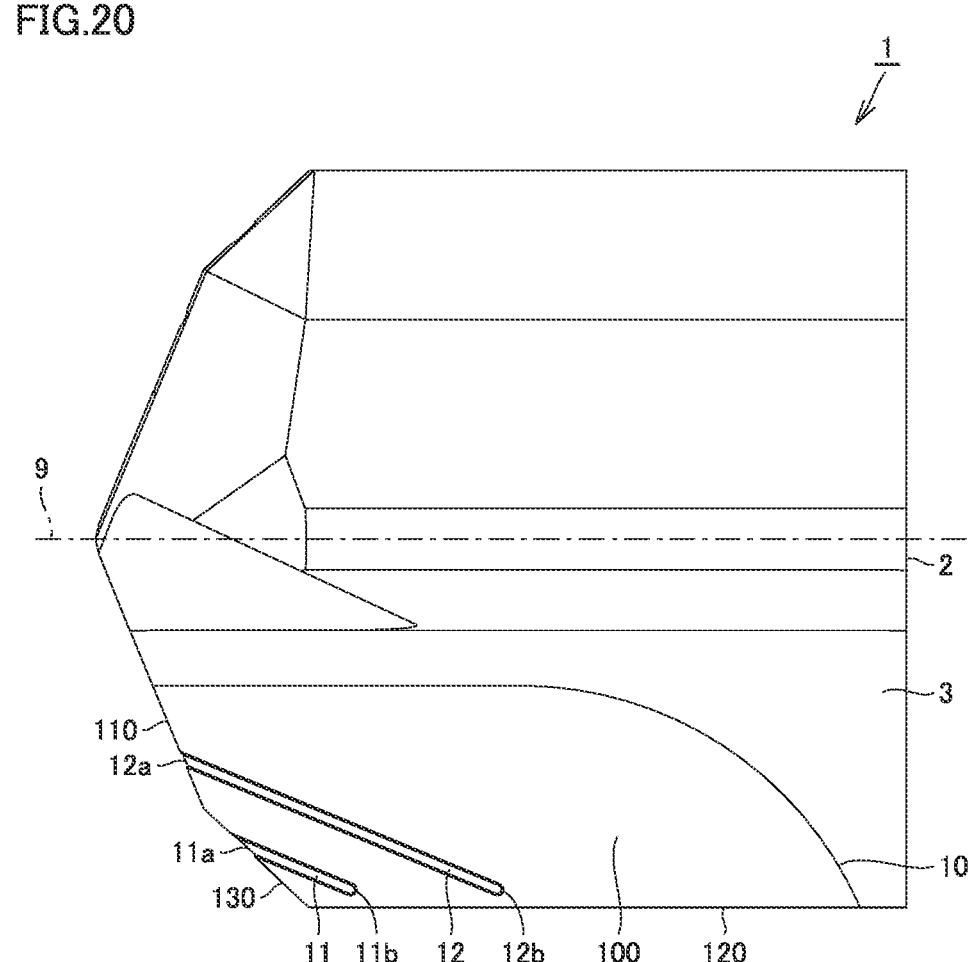
FIG. 20 is a front view of a rotary cutting tool according to a sixth embodiment.

FIG. 20 is a front view of a rotary cutting tool according to a sixth embodiment. As shown in FIG. 20, in a rotary cutting tool 1 according to the sixth embodiment, a corner chamfering cutting edge 130 is provided between front cutting edge 110 and outer peripheral cutting edge 120, and front end 11a of first groove 11 is provided at corner chamfering cutting edge 130. Rear end 11b of groove 11 does not reach outer peripheral cutting edge 120.

Example 1

As a matter common among examples, tools of examples of the present disclosure and comparative examples were produced in the following manner: a diamond sintered material (hereinafter, referred to as PCD) obtained by sintering diamond having an average particle diameter of 5 μm was brazed to a shaft-shaped tool body, and polishing was performed using a diamond grindstone of #1500 to form cutting edges at the front end and outer periphery of the PCD. Then, for each of PCDs in which groove(s) were to be formed in its rake face, the groove(s) were formed in the rake face of the PCD by using a high-output pulse YAG laser increased in light collection property by a galvanometer mirror.

<Differences in Shapes and Orientations of First and Second Grooves>

An inspection was performed with regard to an influence of presence or absence of the first and second grooves and differences in shapes of the first and second grooves over chip. FIGS. 12 to 14 show the basic shape of each tool and examples of the first and second grooves, and FIGS. 16 to 19 show exemplary cross sectional shapes of the first and second grooves.

As comparative examples, the following tools were produced: a tool (tool number 1-b) in which grooves extend to the outer peripheral cutting edge; a tool (tool number 101) in which no first groove is formed; and a tool (tool number 102) in which grooves are parallel to the outer peripheral cutting edge. The shapes, orientations, sizes, and the like of the first and second grooves are shown in Table 1.

TABLE 1

| | | | | | | | | Irregularity of Outer | Condition Machining |
| | | Groove/ | Groove | Groove | Groove | | Groove Intermittent | Peripheral | Allowance |
| Tool | Groove | Bottom | Depth D | Width W | Interval S | Number of | Length W0 | Cutting Edge | in Radius |
| Number | Orientation | Shape | [mm] | [mm] | [mm] | Grooves | [mm] | [μm] | [mm] |
|---|---|---|---|---|---|---|---|---|---|
| | | | | Specification of Tool | | | | | |
| 1 | Outward, | V Shape | 0.13 | 0.17 | 0.3 | 3 | 0.240 | 3 | 2.5 |
| 1-(2) | 45° (FIG. 13) | with Bottom | 0.13 | 0.17 | 0.3 | 3 | 0.240 | 5 | 2.5 |
| 1-(3) | | Surface | 0.13 | 0.17 | 0.3 | 3 | 0.240 | 10 | 2.5 |
| 1-(4) | | (FIG. 18) | 0.13 | 0.17 | 0.3 | 3 | 0.240 | 15 | 2.5 |
| 1-(5) | | | 0.13 | 0.17 | 0.3 | 3 | 0.240 | 20 | 2.5 |
| 1-(6) | | | 0.13 | 0.17 | 0.3 | 3 | 0.240 | 25 | 2.5 |
| 1-(7) | | | 0.13 | 0.17 | 0.3 | 3 | 0.240 | 30 | 2.5 |
| 1-(8) | | | 0.13 | 0.17 | 0.3 | 3 | 0.240 | 35 | 2.5 |
| 1-(9) | | | 0.13 | 0.17 | 0.3 | 3 | 0.240 | 40 | 2.5 |
| 1-b | Outward, 45°; Grooves Extend to Outer Peripheral Cutting Edge | | 0.13 | 0.17 | 0.3 | 3 | 0.240 | 130 | 2.5 |
| 1-c | Inward, 45° (FIG. 12) | | 0.13 | 0.17 | 0.3 | 3 | 0.240 | 15 | 2.5 |
| 2 | Crossed, 45° (FIG. 14) | | 0.13 | 0.17 | 0.3 | 3 × 2 Types | 0.240 | 15 | 2.5 |
| 3 | Outward, 45° | Semi-Circular Shape (FIG. 19) | 0.085 | 0.17 | 0.3 | 3 | 0.240 | 15 | 2.5 |
| 101 | Non-Applicable | Non-Applicable | Non-Applicable | Non-Applicable | Non-Applicable | Non-Applicable | Non-Applicable | 15 | 2.5 |
| 102 | Parallel to Outer Peripheral Cutting Edge (Provided at Positions of 0.3, 0.6 and 0.9 mm from Outer Periphery) | V Shape with Bottom Surface (FIG. 18) | 0.13 | 0.17 | 0.3 | 3 | 0.240 | 15 | 2.5 |

In the column "Groove Orientation", "Outward, 45°" means that each of the first grooves extends and forms an angle of 45° with respect to rotation axis 9 as shown in FIG. 13. Each of the angles described in the column "Groove Orientation" means an angle formed with respect to rotation axis 9. "Groove Intermittent Length WO" means a length, along a radial direction, of a portion of front end 11a at which the ridgeline of front cutting edge 110 ceases to exist due to formation of grooves 11 as shown in FIG. 12.

A position at which the first groove on the outermost periphery intersects with the front cutting edge as measured from outer peripheral cutting edge 120 is 0.3 mm in tool numbers 1 to 1-b, is 0.3 mm in tool number 1-c, is 0.3 mm in tool number 2, is 0.3 mm in tool number 3, and is 0.3 mm in tool number 102 in Table 1. A position at which the second groove on the outermost periphery intersects with the front cutting edge as measured from outer peripheral cutting edge 120 is 0.3 mm in tool number 2 in Table 1.

Each of the above-described tools was used to perform a cutting process under the following conditions so as to evaluate chip processability.

[Cutting Conditions]

Workpiece: aluminum alloy (A6061)
Processed hole: pilot hole diameter of 5 mm; depth of 25 mm
This hole is finished to be 10 mm in diameter. Therefore, machining allowance is 2.5 mm in radius.
Cutting speed: 200 m/min
Feed rate: 0.2 mm/rev
In this evaluation, chip having a curled shape with a length of 5 mm or less and a width of less than or equal to the machining allowance in radius was determined to be excellent. Evaluation results are shown in Table 2.

TABLE 2

| | Chip | Chip | | State of | | |
| Tool | Width | Length | Chip | Hole Wall | Final | Description of |
| Number | [mm] | [mm] | Evaluation | Surface | Evaluation | Final Evaluation |
|---|---|---|---|---|---|---|
| | | | Result of Processing | | | |
| 1 | 0.3 to 0.9 | 3 | A | No Damage | A | |
| 1-(2) | 0.3 to 0.9 | 3 | A | No Damage | A | |
| 1-(3) | 0.3 to 0.9 | 3 | A | No Damage | A | |
| 1-(4) | 0.3 to 0.9 | 3 | A | No Damage | A | |
| 1-(5) | 0.3 to 0.9 | 3 | A | No Damage | A | |
| 1-(6) | 0.3 to 0.9 | 3 | A | No Damage | A | |
| 1-(7) | 0.3 to 0.9 | 3 | A | No Damage | A | |
| 1-(8) | 0.3 to 0.9 | 3 | A | Small Damage Occurs | C | Damage on Processed Surface and Deteriorated Surface Roughness |

TABLE 2-continued

| | | | | Result of Processing | | |
|---|---|---|---|---|---|---|
| Tool Number | Chip Width [mm] | Chip Length [mm] | Chip Evaluation | State of Hole Wall Surface | Final Evaluation | Description of Final Evaluation |
| 1-(9) | 0.3 to 0.9 | 3 | A | Damage Occurs | C | Damage on Processed Surface and Deteriorated Surface Roughness |
| 1-b | 0.3 to 0.9 | 3 | A | Large Processing Mark Remains | C | Damage on Processed Surface and Deteriorated Surface Roughness |
| 1-c | 0.3 to 0.9 | 3 | A | No Damage | A | |
| 2 | 0.3 to 0.9 | 3 | A | No Damage | A | |
| 3 | 0.3 to 0.9 | 7 | B | No Damage | B | B Because Chip is Slightly Long to be More Than 5 mm |
| 101 | 2.5 | 16 | C | No Damage | C | Chip is Long and Chip Width is as Large as Machining Allowance |
| 102 | 0.2 to 1.5 | 14 | C | No Damage | C | Chip is Long |

"A" to "C" in the final evaluation in Table 2 mean as follows.

Evaluation A: Both the width and length (5 mm or less) of the chip were small, and there was no damage on the processed surface.

Evaluation B: The length of the chip was slightly large (5 to 10 mm) but there was no damage on the processed surface.

Evaluation C: Damage occurred on the processed surface; no damage occurred but the chip was long to be 10 mm or more and therefore possibility of occurrence of damage is very high; or no damage occurred but the chip was not cut off in the width direction and remained to be wide even though the length of the chip became short.

It should be noted that these evaluations are also applied to Tables 4, 6, 8, and 10 below.

In each of the tools of tool numbers 1 and 2, the width of the chip was smaller than the machining allowance, and the chip was cut off to have a short length of 3 mm. It is considered that in the tool of tool number 3 in which the cross sectional shape of the first groove was a semicircular shape, the depth of the first groove was shallow with respect to the width of the first groove as compared with the other first groove shapes, with the result that the width of the chip could not be small. Further, due to the same reason, the effect of shortening the length of the chip was small as compared with the other first groove shapes; however, the effect of curling the chip was obtained, and the length of the chip was short to be 3 mm.

On the other hand, in tool number 101 in which no first groove is provided, the chip width was as large as the machining allowance, the chip length was 16 mm, the chip was not curled, and thus there was no effect of cutting off the chip. In view of the above results, it is considered that whether to attain the effect of cutting off the chip results from the difference in shape of the first groove, rather than the processing conditions.

In the tool of tool number 1-c, a mark resulting from scratching with the chip was observed on wall surface 301 that intersects with the extending direction of each of rake face 100 and groove 11, thus confirming that wall surface 301 functions to cut off the chip. In view of this, the chip caused by front cutting edge 110 flows along groove 11 and collides with wall surface 301 in the vicinity of rear end 11b of groove 11, thereby attaining the effect of cutting off the chip.

Further, when the irregularity of the outer peripheral cutting edge is more than 30 μm, damage occurred on the processed surface to result in deteriorated surface roughness.

Example 2

<Difference in Angle of First Groove>

In the present example, a test was conducted with regard to an influence of an angle of the first groove over the cutting-off of chip.

In order to check a difference in cutting-off of chip due to a difference in angle of the first groove, one first groove was provided while the tool shape of Example 1 is basically used.

The following tools were produced: a tool in which the angle of the first groove was parallel to the rotation axis (0°); and tools in each of which the angle of the first groove was changed within a range of 3° to 87° with respect to the rotation axis. The shapes, orientations, sizes, and the like of the first grooves are shown in Table 3. Each of the front ends of the first grooves intersects with the front cutting edge.

TABLE 3

| | | | | | | | | | Condition |
|---|---|---|---|---|---|---|---|---|---|
| | | | | | | | Groove | Irregularity of Outer | Machining |
| Tool Number | Groove Orientation | Groove/ Bottom Shape | Groove Depth D [mm] | Groove Width W [mm] | Groove Interval S [mm] | Number of Grooves | Intermittent Length W0 [mm] | Peripheral Cutting Edge [μm] | Allowance in Radius [mm] |
| 103 | 0° | V Shape | 0.13 | 0.17 | Non-Applicable | 1 | 0.170 | 15 | 2.5 |
| 11 | Outward, 3° | with Bottom | 0.13 | 0.17 | Non-Applicable | 1 | 0.171 | 15 | 2.5 |

TABLE 3-continued

| | | | | | | | | Irregularity | Condition |
| | | | | | | | Groove | of Outer | Machining |
| | | Groove/ | Groove | Groove | Groove | | Intermittent | Peripheral | Allowance |
| Tool | Groove | Bottom | Depth D | Width W | Interval S | Number of | Length W0 | Cutting Edge | in Radius |
| Number | Orientation | Shape | [mm] | [mm] | [mm] | Grooves | [mm] | [μm] | [mm] |
|---|---|---|---|---|---|---|---|---|---|
| 12 | Outward, 5° | Surface | 0.13 | 0.17 | Non-Applicable | 1 | 0.171 | 15 | 2.5 |
| 13 | Outward, 30° | | 0.13 | 0.17 | Non-Applicable | 1 | 0.196 | 15 | 2.5 |
| 14 | Outward, 60° | | 0.13 | 0.17 | Non-Applicable | 1 | 0.340 | 15 | 2.5 |
| 15 | Outward, 85° | | 0.13 | 0.17 | Non-Applicable | 1 | 1.951 | 15 | 2.5 |
| 16 | Outward, 87° | | 0.13 | 0.17 | Non-Applicable | 1 | 1.951 | 15 | 2.5 |
| 104 | 90° | | 0.13 | 0.17 | Non-Applicable | 1 | Non-Applicable | 15 | 2.5 |

In view of restrictions in shape or production, the tools are divided into the following three types: a tool in which the position at which the first groove intersects with the front cutting edge is located at 1.0 mm from the outer peripheral cutting edge; a tool in which the position at which the first groove intersects with the front cutting edge is located at 1.5 mm from the outer peripheral cutting edge; and a tool in which the position at which the first groove intersects with the front cutting edge is located at 2.0 mm from the outer peripheral cutting edge. Specifically, the position is located at 1 mm therefrom in each of tool numbers 103, 11, 12, 13, 14, the position is located at 1.5 mm therefrom in tool number 15, and the position is located at 2 mm therefrom in tool number 16 in Table 3.

As with tool number 1 of Example 1, the cross sectional shape of the first groove is the shape of FIG. 18, and width W of the first groove is 0.17 mm.

Width WO of the intermittent portion of the front cutting edge formed by the first groove intersecting with the front cutting edge differs depending on the angle of the first groove, but can be found by calculation.

Each of the above-described tools was used to perform a cutting process under the following conditions so as to evaluate chip processability.

[Cutting Conditions]

The cutting conditions are as follows.
Workpiece: aluminum alloy (A6061)
Processed hole: pilot hole diameter of 5 mm; depth of 25 mm This hole is finished to be 10 mm. Therefore, machining allowance is 2.5 mm in radius.
Cutting speed: 200 m/min
Feed rate: 0.2 mm/rev Also in this evaluation, as with Example 1, chip having a curled shape with a length of 5 mm or less and a width of less than or equal to the machining allowance in radius was determined to be excellent. It should be noted that the determination was made also in consideration of occurrence of chattering or the like during processing.
Evaluation results are shown in Table 4.

TABLE 4

| | | | | | | |
| | | | | Result of Processing | | |
| | Chip | Chip | | State of | | |
| Tool | Width | Length | Chip | Hole Wall | Final | Description of |
| Number | [mm] | [mm] | Evaluation | Surface | Evaluation | Final Evaluation |
|---|---|---|---|---|---|---|
| 103 | 0.9 to 1.4 | 15 | C | No Damage | C | Chip is Long |
| 11 | 0.9 to 1.4 | 5 to 7 | B | No Damage | B | B Because Chip is Slightly Long to be More Than 5 mm |
| 12 | 0.9 to 1.4 | 5 | A | No Damage | A | |
| 13 | 0.9 to 1.4 | 4 to 5 | A | No Damage | A | |
| 14 | 0.9 to 1.4 | 3 to 5 | A | No Damage | A | |
| 15 | 0.5 to 1.4 | 3 to 5 | A | No Damage | A | |
| 16 | 0.5 to 1.4 | 3 to 5 | A | No Damage | B | Cutting Sound is Slightly Large, Which is Considered as Sign of Increase in Cutting Resistance etc. |
| 104 | 2.5 | 3 | C | No Damage | C | Chip Width is as Large as Machining Allowance in Radius |

In the tool of tool number 11 with the angle of 3°, the chip was curled but the length of the chip was not so short, and therefore the final evaluation was B. In each of the tools of tool numbers 12 to 15 with the angles of 5° to 85°, the effect of cutting off the chip both in width and length by the first groove was observed.

The tool of tool number 16 with the angle of 87° attained the effect of cutting off the chip; however, it was observed that chattering occurred slightly when processing the vicinity of the bottom of the hole. Such chattering occurred presumably due to the following reason: the size of W was very large to be 3.25 mm or more, thus resulting in large cutting resistance at this portion.

In view of these results, it was understood that the first groove preferably has an angle of 5° or more and 85° or less with respect to the rotation axis.

Example 3

<Difference in Depth of First Groove>

In the present example, an inspection was performed with regard to an influence of the depth of each first groove over the chip.

Each of tools was produced in the following manner: the tool shape of tool number 1 of Example 1 was basically used for each tool shape, and the depth of the first groove was changed. The shapes, orientations, sizes, and the like of the first grooves are shown in Table 5.

[Cutting Conditions]

Workpiece: aluminum alloy (A6061)

Processed hole: pilot hole diameter of 5 mm; depth of 25 mm

This hole is finished to be 10 mm. Therefore, machining allowance is 2.5 mm in radius.

Cutting speed: 200 m/min

Feed rate: 0.2 mm/rev

This evaluation is also the same as in Example 1. Evaluation results are shown in Table 6.

TABLE 6

| | Result of Processing | | | | |
|---|---|---|---|---|---|
| Tool Number | Chip Width [mm] | Chip Length [mm] | Chip Evaluation | State of Hole Wall Surface | Final Evaluation |
| 22 | 0.3 to 0.9 | 5 | A | No Damage | A |
| 23 | 0.3 to 0.9 | 4 | A | No Damage | A |
| 24 (Same as 1) | 0.3 to 0.9 | 3 | A | No Damage | A |
| 25 | 0.3 to 0.9 | 3 | A | No Damage | A |
| 26 | 0.3 to 0.9 | 3 | A | No Damage | A |

In each of the tools of tool numbers 22 to 26 in which the respective depths of the first grooves were 0.01 mm to 0.8 mm, the chip was curled and finely cut off.

TABLE 5

| | Specification of Tool | | | | | | | | |
|---|---|---|---|---|---|---|---|---|---|
| Tool Number | Groove Orientation | Groove/ Bottom Shape | Groove Depth D [mm] | Groove Width W [mm] | Groove Interval S [mm] | Number of Grooves | Groove Intermittent Length W0 [mm] | Irregularity of Outer Peripheral Cutting Edge [μm] | Condition Machining Allowance in Radius [mm] |
| 22 | Outward, 45° | V Shape | 0.01 | 0.17 | 0.3 | 3 | 0.240 | 15 | 2.5 |
| 23 | Outward, 45° | with Bottom | 0.07 | 0.17 | 0.3 | 3 | 0.240 | 15 | 2.5 |
| 24 (Same as 1) | Outward, 45° | Surface | 0.13 | 0.17 | 0.3 | 3 | 0.240 | 15 | 2.5 |
| 25 | Outward, 45° | | 0.40 | 0.17 | 0.3 | 3 | 0.240 | 15 | 2.5 |
| 26 | Outward, 45° | | 0.80 | 0.17 | 0.3 | 3 | 0.240 | 15 | 2.5 |

Width W of each first groove and interval S between the first grooves are the same as those in tool number 1, and the position at which the first groove on the outermost periphery intersects with the front cutting edge was a position of 0.3 mm from the outer peripheral portion.

The position of the first groove on the inner peripheral side was a position of 2.5 mm from the outer peripheral portion, and three first grooves were provided in each of the tools.

Each of the above-described tools was used to perform a cutting process under the following conditions so as to evaluate chip processability.

In view of these results, it was understood that the depth of the first groove is preferably 0.01 mm or more and 0.8 mm or less.

Example 4
<Difference in Width of First Groove>

In the present example, a test was conducted with regard to an influence of a difference in width W of each first groove over the chip.

Each of tools was produced in the following manner: the shape of tool number 1 of Example 1 was basically used for each tool shape and the width of the first groove was changed between 0.01 mm and 0.50 mm. The shapes, orientations, sizes, and the like of the first grooves are shown in Table 7.

TABLE 7

| | | | | | | | | Irregularity | Condition |
| | | | | | | | Groove | of Outer | Machining |
| | | Groove/ | Groove | Groove | Groove | | Intermittent | Peripheral | Allowance |
| Tool | Groove | Bottom | Depth D | Width W | Interval S | Number of | Length W0 | Cutting Edge | in Radius |
| Number | Orientation | Shape | [mm] | [mm] | [mm] | Grooves | [mm] | [μm] | [mm] |
|---|---|---|---|---|---|---|---|---|---|
| 32 | Outward, †45° | V Shape | 0.13 | 0.01 | 0.3 | 3 | 0.014 | 15 | 2.5 |
| 33 | Outward, 45° | with Bottom | 0.13 | 0.10 | 0.3 | 3 | 0.141 | 15 | 2.5 |
| 34 | Outward, 45° | Surface | 0.13 | 0.17 | 0.3 | 3 | 0.240 | 15 | 2.5 |
| (Same as 1) | | | | | | | | | |
| 35 | Outward, 45° | | 0.13 | 0.25 | 0.3 | 3 | 0.354 | 15 | 2.5 |
| 36 | Outward, 45° | | 0.13 | 0.50 | 0.3 | 3 | 0.707 | 15 | 2.5 |

Depth D of each first groove and interval S between the first grooves are the same as those of the tool of tool number 1. The position at which the first groove on the outermost periphery intersects with the front cutting edge was a position of 0.3 mm from the outer peripheral portion.

Tool number 34 represents the same tool as that of tool number 1 produced in Example 1.

Since the outermost peripheral portion of the first groove is located at a position of 2.5 mm from the outer peripheral portion, the number of the first grooves differs depending on the width of each first groove.

Each of the above-described tools was used to perform a cutting process under the following conditions so as to evaluate chip processability.

[Cutting Conditions]

Workpiece: aluminum alloy (A6061)
Processed hole: pilot hole diameter of 5 mm; depth of 25 mm This hole is finished to be 10 mm. Therefore, machining allowance is 2.5 mm in radius.

Cutting speed: 200 m/min
Feed rate: 0.2 mm/rev

This evaluation is also the same as in Example 1. Evaluation results are shown in Table 8.

TABLE 8

| | Result of Processing | | | | |
| | Chip | Chip | | State of | |
| Tool | Width | Length | Chip | Hole Wall | Final |
| Number | [mm] | [mm] | Evaluation | Surface | Evaluation |
|---|---|---|---|---|---|
| 32 | 0.3 to 1.6 | 5 | A | No Damage | A |
| 33 | 0.3 to 1.2 | 4 | A | No Damage | A |
| 34 | 0.3 to 0.9 | 3 | A | No Damage | A |
| (Same as 1) | | | | | |
| 35 | 0.3 to 0.5 | 3 | A | No Damage | A |
| 36 | 0.3 to 0.7 | 3 | A | No Damage | A |

In each of the tools of tool numbers 32 to 36, the chip was curled and cut off, thereby obtaining small chip.

Example 5

<Difference in Interval Between First Grooves>

In the present example, a test was conducted with regard to an influence of a difference in interval S between the first grooves over the chip.

Each of tools was produced in the following manner: the shape of tool number 1 of Example 1 was basically used for each tool shape and the interval between the first grooves was changed. The shapes, orientations, sizes, and the like of the first grooves are shown in Table 9.

TABLE 9

| | | | | | | | | Irregularity | Condition |
| | | | | | | | Groove | of Outer | Machining |
| | | Groove/ | Groove | Groove | Groove | | Intermittent | Peripheral | Allowance |
| Tool | Groove | Bottom | Depth D | Width W | Interval S | Number of | Length W0 | Cutting Edge | in Radius |
| Number | Orientation | Shape | [mm] | [mm] | [mm] | Grooves | [mm] | [μm] | [mm] |
|---|---|---|---|---|---|---|---|---|---|
| 42 | Outward, 45° | V Shape | 0.13 | 0.17 | 0.10 | 3 | 0.240 | 15 | 2.5 |
| 43 | Outward, 45° | with Bottom | 0.13 | 0.17 | 0.15 | 3 | 0.240 | 15 | 2.5 |
| 44 | Outward, 45° | Surface | 0.13 | 0.17 | 0.30 | 3 | 0.240 | 15 | 2.5 |
| (Same as 1) | | | | | | | | | |
| 45 | Outward, 45° | | 0.13 | 0.17 | 0.50 | 3 | 0.240 | 15 | 2.5 |
| 46 | Outward, 45° | | 0.13 | 0.17 | 1.00 | 3 | 0.240 | 15 | 2.5 |
| 47 | Outward, 45° | | 0.13 | 0.17 | 2.00 | 3 | 0.240 | 15 | 2.5 |

Depth D of each first groove and width W of the first groove are the same as those in tool number 1. The position at which the first groove on the outermost periphery intersects with the front cutting edge was a position of 0.3 mm from the outer peripheral portion.

The tools were produced in each of which interval S between the first grooves differs between 0.10 mm and 2.00 mm. Tool number 44 represents the same tool as that of tool number 1 of Example 1.

Since the outermost peripheral portion of the first groove is located at the position of 2.5 mm from the outer peripheral portion, the number of the first grooves differs depending on the interval between the first grooves.

Each of the above-described tools was used to perform a cutting process under the following conditions so as to evaluate chip processability.

[Cutting Conditions]

Workpiece: aluminum alloy (A6061)
Processed hole: pilot hole diameter of 5 mm; depth of 25 mm
This hole is finished to be 10 mm. Therefore, machining allowance is 2.5 mm in radius.
Cutting speed: 200 m/min
Feed rate: 0.2 mm/rev
This evaluation is also the same as in Example 1. Evaluation results are shown in Table 10.

TABLE 10

| | Result of Processing | | | | |
|---|---|---|---|---|---|
| Tool Number | Chip Width [mm] | Chip Length [mm] | Chip Evaluation | State of Hole Wall Surface | Final Evaluation |
| 42 | 0.3 to 1.3 | 5 | A | No Damage | A |
| 43 | 0.3 to 1.2 | 4 | A | No Damage | A |
| 44 (Same as 1) | 0.3 to 0.9 | 3 | A | No Damage | A |
| 45 | 0.3 to 0.5 | 3 | A | No Damage | A |
| 46 | 0.3 to 1.0 | 3 | A | No Damage | A |
| 47 | 0.3 to 2.0 | 3 | A | No Damage | A |

In each of the tools of tool numbers 43 to 45, the chip was curled and cut off, thereby obtaining small chip.

It was observed that in the tool of tool number 42 in which the interval between the first grooves was 0.10 mm, the chip was slightly welded because the front cutting edge had a shape close to a comb shape; however, since the welding was small, the effect of curling and cutting off the chip was not decreased.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The rotary cutting tool can be suitably applied to a drill or reamer used to process a fitting hole of an aluminum alloy or non-ferrous metal.

REFERENCE SIGNS LIST

1: rotary cutting tool; 2: tool body; 9: rotation axis; 10: cutting edge tip; 11, 12, 13, 14: first groove; 15, 16: groove; 11a, 12a, 13a, 14a, 15a, 16a, 212a: front end; 11b, 12b, 13b, 14b, 15b, 16b, 212b: rear end; 11d: side surface; 11e: bottom surface; 11f: tapered surface; 100: rake face; 110: front cutting edge; 120: outer peripheral cutting edge; 130: corner chamfering cutting edge; 212: second groove; 301, 302: wall surface; 311: line.

The invention claimed is:

1. A reamer comprising a tool body and a cutting edge tip provided at the tool body, wherein
at least one first groove is provided in a rake face of the cutting edge tip, wherein the rake face is defined by the tool body and the cutting edge tip,
the first groove has a portion inclined with respect to a rotation axis,
a front end of the first groove is disposed on a front cutting edge or a corner chamfering cutting edge, the front end of the first groove being configured to cut off a chip,
a rear end of the first groove is provided on an inner side with respect to an outer peripheral cutting edge, and an irregularity of the outer peripheral cutting edge at a ridgeline portion thereof in a direction parallel to the rake face is 30 μm or less, and
at least one second groove is provided in the rake face of the cutting edge tip, a front end of the second groove is provided at the front cutting edge or the corner chamfering cutting edge, a rear end of the second groove is provided on an inner side with respect to an outer periphery, and the first groove and the second groove intersect with each other,
wherein a depth of the first groove is 0.01 mm or more and 0.8 mm or less, and
wherein a width of the first groove is 0.01 mm or more and 0.5 mm or less,
wherein the irregularity results from:
chipping caused at the ridgeline portion of the outer peripheral cutting edge,
detachment in a vicinity of a ridgeline on the rake face side, or
the first or second groove being formed to extend to the outer peripheral cutting edge portion.

2. The reamer according to claim 1, wherein the first groove is inclined toward an inner peripheral side in a direction from the front end toward the rear end of the first groove, and a wall surface intersecting an extending direction of each of the rake face and the first groove is provided in a vicinity of the rear end of the first groove.

3. The reamer according to claim 1, wherein
the cutting edge tip comprises the rake face,
an outer peripheral surface comprises the outer peripheral cutting edge,
a front surface comprises the front cutting edge or the corner chamfering cutting edge, and
the front end of the first groove forms a recess on the front surface.

4. A reamer comprising a tool body and a cutting edge tip provided at the tool body, wherein
at least one first groove is provided in a rake face of the cutting edge tip, wherein the rake face is defined by the tool body and the cutting edge tip,
the first groove has a portion inclined with respect to a rotation axis,
a front end of the first groove is disposed on a front cutting edge or a corner chamfering cutting edge, the front end of the first groove being configured to cut off a chip,
a rear end of the first groove is provided on an inner side with respect to an outer peripheral cutting edge, and an irregularity of the outer peripheral cutting edge at a ridgeline portion thereof in a direction parallel to the rake face is 30 μm or less, and the first groove is inclined toward an inner peripheral side in a direction from the front end toward the rear end of the first groove, and a wall surface intersecting an extending direction of each of the rake face and the first groove is provided in a vicinity of the rear end of the first groove, wherein the first groove is in a form of a straight line, and has an angle of 5° or more and 85° or less with respect to the rotation axis, wherein a plurality of the first grooves are provided, and an interval between the plurality of first grooves is 0.1 mm or more and 2 mm or less, wherein a depth of the first groove is 0.01 mm or more and 0.8 mm or less, and wherein a width of the first groove is 0.01 mm or more and 0.5 mm or less, wherein the irregularity results from
    chipping caused at the ridgeline portion of the outer peripheral cutting edge,
    detachment in a vicinity of a ridgeline on the rake face side, or
    the first or second groove being formed to extend to the outer peripheral cutting edge portion.

5. The reamer according to claim 4, wherein a cross sectional shape of the first groove is a V shape, a quadrangular shape, or a shape obtained by combining the V shape and the quadrangular shape.

6. The reamer according to claim 4, wherein
    the cutting edge tip comprises the rake face,
    an outer peripheral surface comprises the outer peripheral cutting edge,
    a front surface comprises the front cutting edge or the corner chamfering cutting edge, and
    the front end of the first groove forms a recess on the front surface.

* * * * *